US009800427B2

(12) United States Patent
Cashman et al.

(10) Patent No.: US 9,800,427 B2
(45) Date of Patent: Oct. 24, 2017

(54) SYSTEM AND METHOD FOR DISTRIBUTING ELECTRONIC AND PAPER DOCUMENTS AS PER CUSTOMER CONSENT

(71) Applicant: Hartford Fire Insurance Company, Hartford, CT (US)

(72) Inventors: Mark S. Cashman, Windsor, CT (US); Fred Y. Choi, Unionville, CT (US); Alan J. Yezierski, Bloomfield, CT (US); Holly Sebrell Condon, West Suffield, CT (US); Jeffrey J. Ryan, West Simsbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 819 days.

(21) Appl. No.: 13/720,101

(22) Filed: Dec. 19, 2012

(65) Prior Publication Data
US 2014/0173001 A1 Jun. 19, 2014

(51) Int. Cl.
| G06F 15/16 | (2006.01) |
| H04L 12/18 | (2006.01) |
| H04L 12/58 | (2006.01) |

(52) U.S. Cl.
CPC .......... *H04L 12/1895* (2013.01); *H04L 51/30* (2013.01)

(58) Field of Classification Search
CPC ............................. H04L 12/1895; H04L 51/30
USPC ....................................................... 709/206
See application file for complete search history.

(56) References Cited

U.S. PATENT DOCUMENTS

| 7,949,574 | B2 | 5/2011 | Patel et al. |
| 8,358,771 | B1* | 1/2013 | Moore et al. ............ 379/265.01 |
| 8,856,639 | B1* | 10/2014 | Strudell et al. ............... 715/221 |
| 2005/0027676 | A1* | 2/2005 | Eichstaedt et al. ............... 707/1 |
| 2008/0109445 | A1* | 5/2008 | Williams ............... G06Q 30/00 |
| 2010/0268754 | A1* | 10/2010 | Holton .......................... 709/203 |
| 2011/0173077 | A1 | 7/2011 | Patel et al. |
| 2011/0191435 | A1* | 8/2011 | Burakoff et al. ............. 709/206 |
| 2012/0078766 | A1 | 3/2012 | Rose et al. |
| 2012/0078813 | A1 | 3/2012 | Rose et al. |
| 2012/0116880 | A1 | 5/2012 | Patel et al. |
| 2012/0150659 | A1 | 6/2012 | Patel et al. |

* cited by examiner

*Primary Examiner* — Tauqir Hussain
(74) *Attorney, Agent, or Firm* — Volpe and Koenig, P.C.

(57) ABSTRACT

A system for enterprise distribution of electronic and paper documents for multiple insurance products is disclosed. The system including a memory device to store policy information for multiple insurance products associated with each of a plurality of clients. The memory device stores document delivery settings, including contact information and notification/alert preferences. The system includes a processor to generate document delivery questions relating to the preferred medium for notification and alert documents. The system includes a receiver to receive responses to the document delivery questions. The processor generates consent questions and updates the document delivery settings based on the response to the document delivery questions and the consent questions. The system may also include a transmitter to transmit a message to the clients notifying them of the change in the document delivery settings and to transmit a message notifying a source system of the change in document delivery settings.

15 Claims, 14 Drawing Sheets

PLEASE SELECT HOW YOU WOULD LIKE TO RECEIVE NOTIFICATIONS OF LATE PAYMENT FOR THE FOLLOWING INSURANCE PRODUCTS TO WHICH YOU ARE SUBSCRIBED?

| | PAPER (DEFAULT) | EMAIL | SMS | FAX | TWITTER |
|---|---|---|---|---|---|
| AUTO INSURANCE | ■ | □ | □ | □ | □ |
| BUSINESS INSURANCE | □ | ■ | ■ | □ | ■ |
| HEALTH INSURANCE | ■ | □ | □ | □ | □ |
| HOMEOWNERS INSURANCE | ■ | □ | □ | □ | □ |

SUBMIT 281  CANCEL 282  BACK 283

SYSTEM AND METHOD FOR DISTRIBUTING ELECTRONIC AND PAPER DOCUMENTS AS PER CUSTOMER CONSENT

BACKGROUND

An insurance customer/client may obtain a number of different types of insurance products from insurance companies, such as but not limited to business insurances, as well as personal insurances (such as life insurance, auto insurance, homeowners insurance, disability insurance, and critical illness insurance). Generally, the insurer provides the client with at least two types of documents, notifications and alerts. Notifications may be regularly scheduled communications and alerts may be triggered by an event. When a client wants to receive documents, including alerts and notifications, electronically from an insurer, the party must legally consent to receive these documents and also consent to allow the insurer to turn off paper document delivery for those communications which are normally delivered through physical mail. In addition, the client needs to provide associated delivery preferences for each relevant communication type. In order to do this, the client may be required to contact each insurer for each policy to confirm a notification method. This may be cumbersome, especially for businesses or individuals who may have purchased multiple insurance products from different groups. Accordingly, methods for distributing electronic and paper documents as per client consent are desired.

SUMMARY

A system for enterprise distribution of electronic and paper documents for multiple insurance products is disclosed. The system may include a memory device to store policy information for multiple insurance products associated with each of a plurality of clients. The memory device also stores document delivery settings, including contact information and notification/alert preferences for each of the multiple insurance products. A processor to generate a plurality of document delivery questions relating to the preferred medium for notification and alert documents for each of the multiple insurance products. The system including a receiver to receive a response to the document delivery questions from a user device. The processor further able to generate consent questions and update the document delivery settings in the memory device for the multiple insurance products based on the response to the document delivery questions and the consent questions. The system may also include a transmitter to transmit a message to the clients notifying them of the change in the document delivery settings. The transmitter also may transmit a message to a source system notifying the source system of the change in document delivery settings. The processor may also determine whether the messages were not received or received in error.

BRIEF DESCRIPTION OF THE DRAWINGS

A more detailed understanding may be had from the following description, given by way of example in conjunction with the accompanying drawings wherein:

FIGS. 5A and 5B are example web pages that include one or more questions that solicit information from the client related to the type of documents they prefer to receive;

DETAILED DESCRIPTION

Disclosed herein are processor-executable methods, computing systems, and related technologies for the distributing electronic and paper documents as per client consent. The central consent management system may manage and store consent information for multiple insurance products, as well as define the contents of a web interface that may be used by clients to modify consent for multiple insurance products. An insurance client may request to receive documents, (e.g. alerts and notifications) electronically for a plurality of insurance products. The client must legally consent to receive these documents electronically and also consent to allow the insurer to de-activate paper document delivery for communications delivered through physical mail. In addition, the client may provide associated delivery preferences for each relevant communication type. The resulting information may be stored and managed in a database for use by interactive and non-interactive systems. The system and method described hereafter provides an integration interface and a data model that flexibly allows multiple lines of business to store and retrieve consent and preferences using one or more keys to represent identity.

Clients may be represented within multiple source systems from within and outside the primary insurer, owning products from multiple lines of business. Also, lines of business may change organization over time. Therefore the data model supports this variable structure.

Clients may consent that alerts and notifications are dispatched through any combination of digital channels and mediums (e.g. email, SMS, facsimile, twitter, Facebook, etc.). The system may then notify other systems of changes as they occur. A message indicating changes to consent may be transmitted to the client involved, in order to ensure the validity of the change. Therefore messages may be sent to those clients as part of the transaction.

Figure 1:
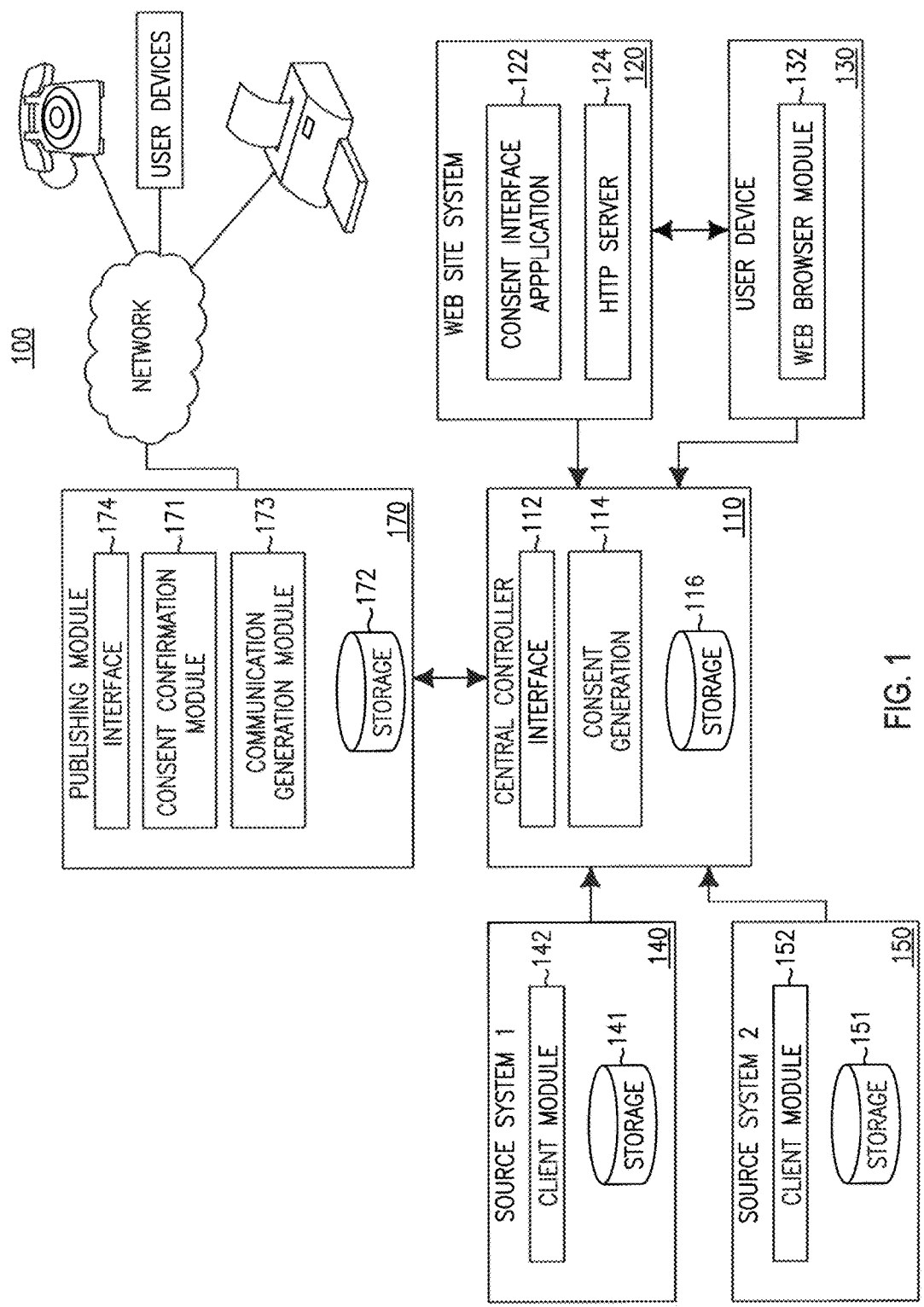
FIG. 1 shows an example architecture that may be used for the distributing electronic and paper documents.

FIG. 1 shows an example architecture 100 that may be used for the managing consent and communication information. The example architecture 100 includes a central controller 110, source systems 140 and 150, a web site system 120 and a user device 130, and a publishing module 170.

In the example architecture 100 of FIG. 1, publishing module 170, the central controller 110, and the web site system 120 are under the control of an insurance company. The user device 130 is operated by an insurance client. Source system 140 and source system 150 may be controlled by the insurance company or by outside insurance companies. As will be described in greater detail hereafter, the central controller 110 manages consent and distribution for electronic and paper documents for multiple insurance products that are controlled by the source systems. The web site system 120 provides a web site that may be accessed by an insurance client or agent operating the user device 130. As will be described in further detail below, the publishing module 170 generates customized documents, (e.g. notification and alert messages) that may be provided to insurance clients. Using this web site, the insurance client operating a user device 130 may submit request to configure document distribution settings for existing insurance policies or to modify document distribution settings for a new insurance policy. The central controller 110 may then modify the document distribution settings for multiple source systems (e.g. 140, 150). The central controller 110 may transmit a notification message to the client, the message indicating changes to the document distribution settings. This notification may be through any number of available communication channels (e.g. email, SMS, social media, or the web site). The central controller 110 may send a message to the publishing module 170, the message indicating any changes to the client's document distribution settings. The publishing module 170 is configured to format documents for transmission to the client via different communication channels.

The central controller 110 includes a consent generation module 114, a central database 116, and an interface module 112. The interface module 112 communicates with the publishing module 170, with the web site system 120, and multiple source systems 140, 150. The central controller 110 receives input data requesting changes in document distribution settings from the web site system 120. The consent generation module 114, of the central controller 110, sends a message to the user device 130 requesting confirmation of consent to change the document distribution settings. The central controller 110 may receive a message from the user device 130 indicating consent to change the document distribution settings. The central controller 110 then sends a message to the source systems 140, 150, the message indicating any changes to the client's document delivery settings and waits for an acknowledgment message confirming that the changes are recorded by the source system. The central controller 110 stores the document distribution settings and consent information in the central database 116. The central database 116 separates the consent by line of business. The central database 116 also contains a key used to match requests or to get or set consent. The central controller 110 may also generate information that may be used by the web site system 120 for presenting displaying information to a user device 130 operated by the client. The central controller 110 may provide information to the communication generation module 173 of messages to be generated, including specific information for specific clients and general information to be included in all templates. Additionally, the central controller 110 may notify the publishing module 170 of the timing for sending messages to a client. The central controller 110 may receive user input from input devices (not depicted) that are included in or connected to the central controller 110. These input devices may include, for example, a keyboard, a mouse, or a touch screen, which provide data that indicates the input to the central controller 110. The central database 116 may be spread across one or more computer-readable media, and may be or include one or more relational databases, hierarchical databases, object-oriented databases, one or more flat files, one or more spreadsheets, and/or one or more structured files. The central database 116 may be managed by one or more database management systems (not depicted), which may be based on a technology such as Microsoft SQL Server, MySQL, PostgreSQL, Oracle Relational Database Management System (RDBMS), a NoSQL database technology, and/or any other appropriate technology. Communication between the central controller 110 and the other elements 120, 130, 140, 150, 170 in the example architecture 100 of FIG. 1 may be performed via the interface module 112 in the central controller 110. Communication between the interface module 112 and the other elements 120, 130, 140, 150, 170, in the example architecture 100 may be performed using technologies such as Simple Object Access Protocol (SOAP), Representational State Transfer (REST), other appropriate Service Oriented Architecture (SOA) technology or web services technology, and/or other appropriate technology.

The publishing module 170 includes a consent confirmation module 171, a communication database 172, a communication generation module 173, and an interface module 174. The interface module 174 communicates with the central controller 110, a network, and one or more document publishing devices (e.g. a phone, a fax machine, a printer, a computer). The communication generation module 173 receives input data and, using one or more communication templates, generates customized notification and alert documents based on the input data. This input data may include the message to be transmitted, the client's information, and the client's selected document medium (e.g. email, SMS, paper). The publishing module 170 may also generate information that may be used by the web site system 120 for presenting displaying information to a user device 130 operated by the client. The communication database 172 stores information such as the information that describes the communication templates used by the communication generation module 173, information that includes contact information over different mediums of insurance clients that have policies, and/or other information. These templates may include, for example, templates for documents via, email, SMS, MMS, robo-calls, facsimile, Twitter, Facebook, physical mail.) Based on input received from the central controller 110, the publishing module 170 may be generate messages (i.e. email, SMS, MMS, facsimile, hard copy, twitter, Facebook) and store the messages in the communication database 172. The messages may be generated using the templates, contact information, and information sent from the central controller 110. Through the interface module 174, the publishing module 170 may receive instructions, from the central controller 110, to transmit the messages, if they are in an electronic medium. The publishing module 170 may also be functionally coupled to one or more printers, which may be used to print documents. The communication database 172 may be spread across one or more computer-readable media, and may be or include one or more relational databases, hierarchical databases, object-oriented databases, one or more flat files, one or more spreadsheets, and/or one or more structured files. The communication database 172 may be managed by one or more database management systems (not depicted), which may be based on a technology such as Microsoft SQL Server, MySQL, PostgreSQL, Oracle Relational Database Management System (RDBMS), a NoSQL database technology, and/or any other appropriate technology. Communication between the publishing module 170 and the other elements 110, 120, 130, 140, 150 in the example architecture 100 of FIG. 1 may be performed via the interface module 174 in the publishing module 170. Communication between the interface module 174 and the other elements 110, 120, 130, 140, 150, in the example architecture 100 may be performed using technologies such as Simple Object Access Protocol (SOAP), Representational State Transfer (REST), other appropriate Service Oriented Architecture (SOA) technology or web services technology, and/or other appropriate technology.

The source system 140 is a computer or other type of data processing device or computing device that manages and provide insurance policies for insurance clients. The source system 140 may include a database 141 for storing information related to the insurance policies that it manages. The operator of the source system 140 may be an employee or agent in, for example, an insurance agency or client operations department for an insurance company. The source system 140 includes a client module 142, which may be or include a web browser application, a specific-purpose client application, and/or any other appropriate type of application. The source system 140 may receive user input from input devices (not depicted) that are included in or connected to the source system 140. These input devices may include, for example, a keyboard, a mouse, or a touch screen, which provide data that indicates the input to the client module 142. The source system 140 may also be connected to one or more printers, which may be used to print documents obtained by the source system 140. Alternatively, source system 140 may receive information via a webpage operated by the client module 142. In this example, a client using a client device may access the web page generated by the client module 142 and sign up for an insurance policy. Further, the client module 142 may communicate with the consent generation module 114 in the central controller 110. As one example, the central controller 110 may receive a request from an insurance client for a modification to an existing communication setting. The central controller 110 may provide input data to the source system 140 describing the requested modification, and/or other information. The source system 140 may then request confirmation of consent. The central controller 110 may access the central database 116 which stores the consent and provide information concerning the consent to the source system 1. The source system 1 may provide an acknowledgment to the central controller 110 acknowledging the change and accepting the consent information. The source system 140 may print the consent information via a printer connected to the source system 140 for records keeping; alternatively, the source system 140 may store the consent information in the database 141.

Source system 150 is also computer or other type of data processing device or computing device that manages and provide insurance policies for insurance clients. Source system 150 has functionality as described above with respect to source system 140. The operator of the source system 150 may be an employee or agent in, for example, an insurance agency or client operations department for the same or different insurance company as source system 140.

While only two source systems 140 and 150 are shown in FIG. 1, this is an example only. Any number of source systems may be in communication with central controller 110.

As mentioned above, the web site system 120 provides a web site that may be accessed by an insurance client operating the user device 130. The web site system 120 includes a HyperText Transfer Protocol (HTTP) server module 124 and a consent interface application module 122. The HTTP server module 124 may implement the HTTP protocol, and may communicate HyperText Markup Language (HTML) pages and related data from the web site to/from the user device 130 using HTTP. The web site system 120 may be connected to one or more private or public networks (such as the Internet), via which the web site system 120 communicates with devices such as the user device 130. The web site system 120 may generate one or more web pages that communication setting information, may communicate the web pages to the user device 130, and may receive responsive information from the user device 130. The responsive information may include information that identifies the insurance client, information that describes the modification that the client is requesting, and/or other information. The web site system 120 may then communicate this information to the central controller 110, which may communicate to multiple source systems to modify the document distribution settings. The web site system 120 may then communicate one or more web pages to the user device 130 that indicate that the insurance company has agreed to modify the document distribution settings for the client.

The HTTP server module 124 in the web site system 120 may be, for example, an Apache HTTP server, a Sun-ONE Web Server, a Microsoft Internet Information Services (IIS) server, and/or may be based on any other appropriate HTTP server technology. The web site system 120 may also include one or more additional components or modules (not depicted), such as one or more load balancers, firewall devices, routers, switches, and devices that handle power backup and data redundancy. The consent interface application module 122 may generate the web pages that make up the web site and that are communicated by the HTTP server module 124. The consent interface application module 122 may be implemented in and/or based on a technology such as Active Server Pages (ASP), PHP: Hypertext Preprocessor (PHP), Python/Zope, Ruby, Ruby on Rails (RoR), any server-side scripting language, and/or any other appropriate technology.

The user device 130 is, for example, a cellular phone, a desktop computer, a laptop computer, a tablet computer, or any other appropriate computing device. The user device 130 includes a web browser module 132, which may communicate data related to the web site to/from the HTTP server module 124 and the consent interface application module 122 in the web site system 120. The web browser module 132 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 132 may implement Rich Internet Application (RIA) and/or multimedia technologies such as Adobe Flash, Microsoft Silverlight, and/or other technologies. The web browser module 132 may implement RIA and/or multimedia technologies using one or web browser plug-in modules (such as, for example, an Adobe Flash or Microsoft Silverlight plug-in), and/or using one or more sub-modules within the web browser module 132 itself. The web browser module 132 may display data on one or more display devices (not depicted) that are included in or connected to the user device 130, such as a liquid crystal display (LCD) display or monitor. The user device 130 may receive input from the user of the user device 130 from input devices (not depicted) that are included in or connected to the user device 130, such as a keyboard, a mouse, or a touch screen, and provide data that indicates the input to the web browser module 132.

The example architecture 100 of FIG. 1 may also include one or more wired and/or wireless networks (not depicted), via which communications between the elements 110, 120, 130, 140, 150, 160, 170 in the example architecture 100 may take place. The networks may be private or public networks, and/or may include the Internet. In one example deployment scenario, the central controller 110, web site system 120, source system 140, source system 150, and publishing module 170 may communicate via one or more private networks that are under the control of the insurance company, while the user device 130 may communicate with the web site system 120 via the Internet.

Each or any combination of the modules shown in FIG. 1 may be implemented as one or more software modules, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules may perform functionality described herein with reference to FIGS. 2-9.

Figure 2:
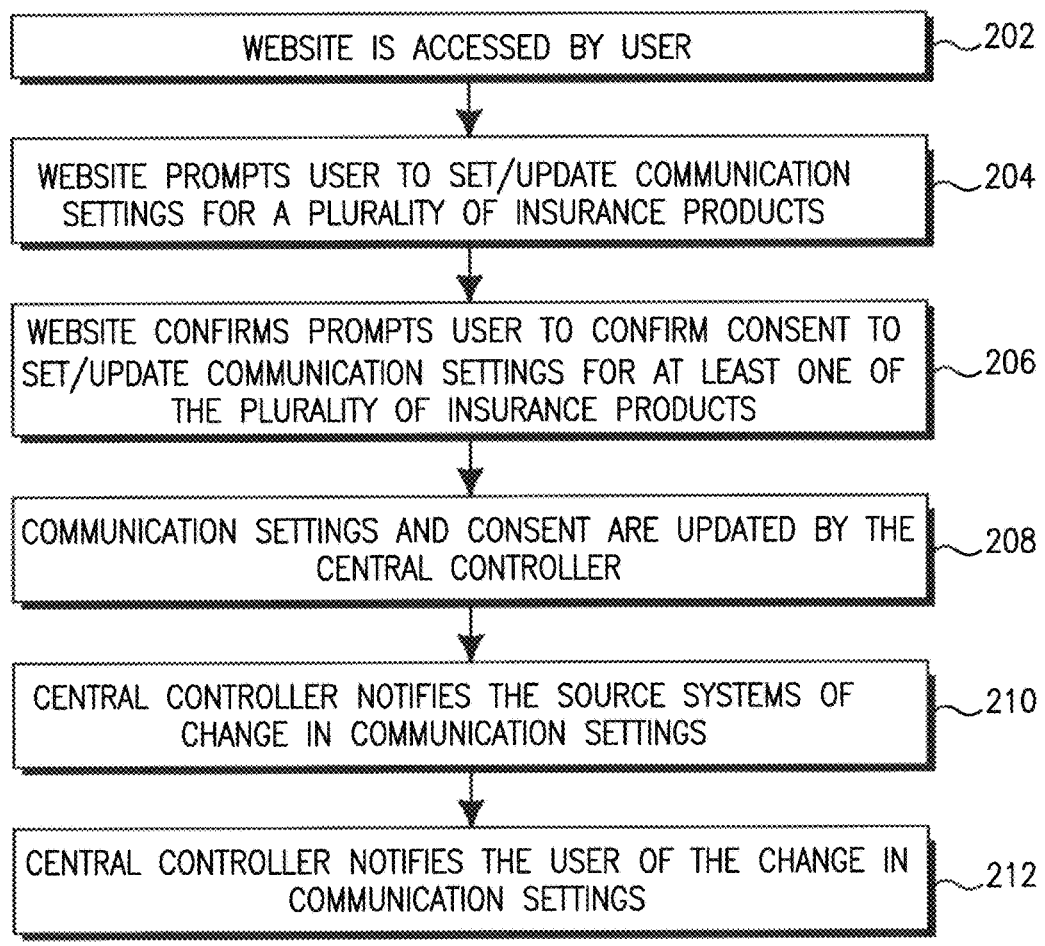
FIG. 2 shows an example use case for method for distributing electronic and paper documents to a client, for multiple insurance products.

FIG. 2 shows an example use case for method 200 for distributing electronic and paper documents to a client for multiple insurance products. The method 200 of FIG. 2 begins with the web site of the insurance company receiving information from an insurance client that indicates that an insurance client is requesting to setup or update document distribution settings for a multiple insurance products (step 202). The multiple insurance products at issue may include disability insurance, critical illness insurance, business insurance, auto insurance and/or any other type of insurance. The multiple insurance products may all be managed by the same insurance company or multiple insurance companies.

The user of the client device 130 is presented with a web page. The web site may include a page that includes questions of one or more types. As an example, questions of a first type may solicit information regarding specific confirmation of the user's identity, while questions of a second type may solicit information related to the document distribution settings preferred by the user for each of the multiple insurance products. (Step 204). The user may provide information that is responsive to the questions, which may then be transmitted to the web site system 120 by the client device 110. While the web site is one way for the central controller 110, this information may be communicated to the insurance company in any number of ways, such as via telephone conversation, fax, email, mail, or any other appropriate mechanism. In an instance where this information is provided via telephone, mail, or fax, an operator of an agent device (not shown) may provide the information to the central controller 110 by inputting the information via the agent device. Alternatively, in an instance where this information is provided in an electronic format (e.g., via email or other mechanism), the central controller 110 may receive the information directly in an electronic format.

After receiving this information, the user of the client device 130 may be presented with another web page that includes questions that may solicit consent from the user for the updated document distribution settings. (Step 206). The user may provide information that is responsive to the questions, which may then be transmitted to the web site system 120 by the client device 110.

The central controller 110 then updates the document distribution settings for the multiple insurance products associated with the client. This may include storing the updated communication information in the central database 116. (Step 208).

The central controller 110 may then notify each source system associated with each of the multiple insurance products that the client has updated the document distribution settings. This may also include sending the consent information to the source systems, so that they may store a copy of the consent information. (Step 208).

Finally, the central controller 110 may also notify one or multiple contacts associated with the client, that the document distribution settings have changed and that a new medium may be used to present the clients with notifications and alerts. (Step 212).

Figure 3:
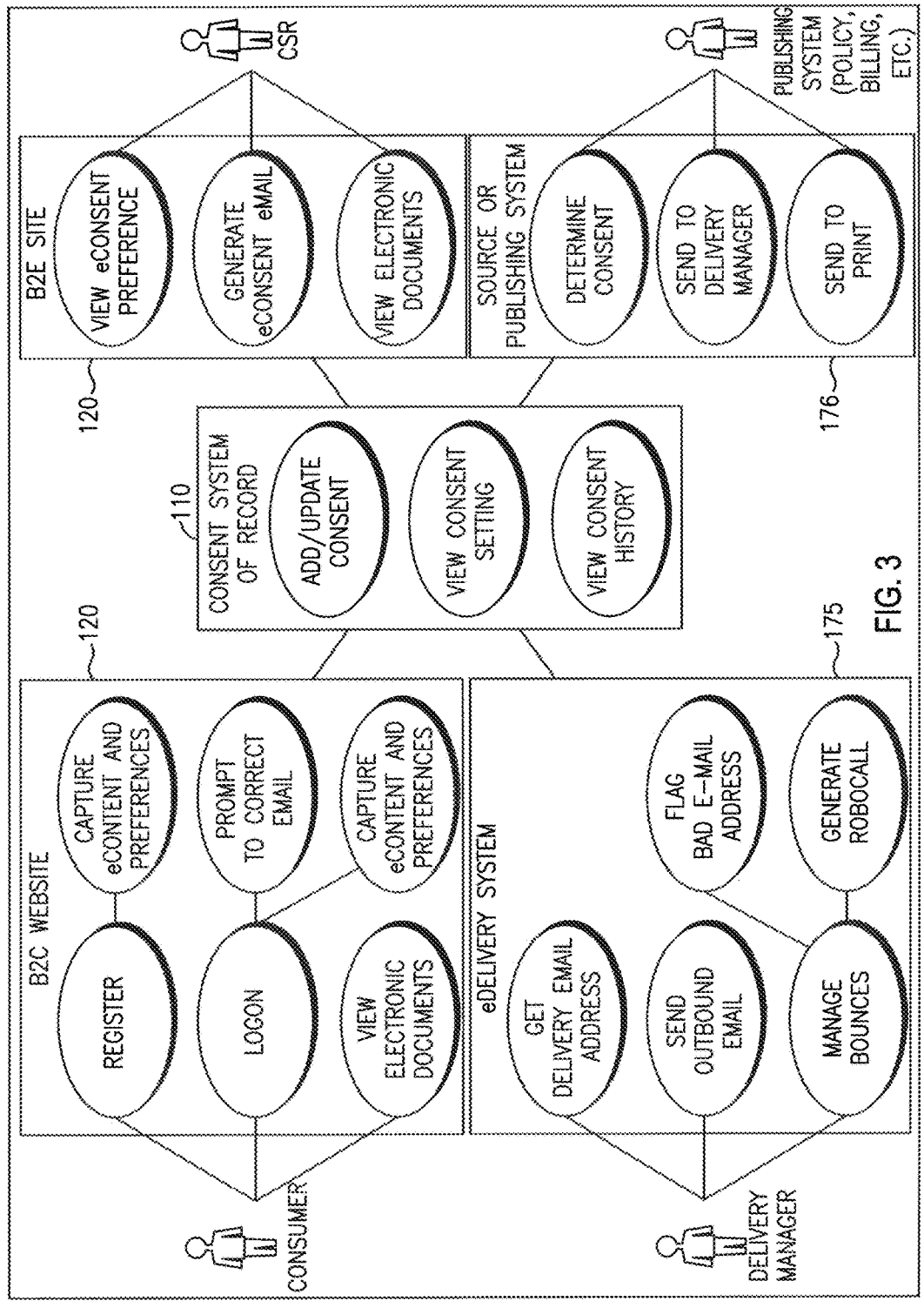
FIG. 3 shows a block diagram of a high level overview of the publishing module.

FIG. 3 shows a block diagram of a high level functional overview of from a user perspective. As shown in FIG. 3, a client or an employee or agent of the insurance company can access the web site system 120. When the client accesses the web site system 120, they are presented with questions soliciting a response from the user of a client device 130 to register with the insurance company. If the user elects to enter the registration process, the user of the client device 130 is presented with questions that solicit document distribution settings. If the user has previously registered, they may select a login option. The user may enter appropriate login information via the user device 130 to gain access to the system. At this point, the user of the client device 130 may be presented with a web page that includes questions that solicit a user response to update an email or other contact address. The user may be prompted with this question, for example, if previous emails to that user were bounced back. Alternatively, the user may be presented with a web page with questions that solicit a user response to update document distribution settings.

Also shown in FIG. 3, an employee or agent of the insurance company, using a user device, may access the web site, or may have access to an intranet with access to the information stored on the central controller 110. The employee or agent may view the document distribution settings of a client. Additionally, the employee may generate a consent email, confirming consent by a client. Finally, the employee may, using a user device, view the stored electronic documents.

The publishing module 170 may comprise two subsystems, an eDelivery system 175 and analog delivery system 176. The eDelivery system may access the communication database 172 and receive email addresses for a set of clients. The eDelivery system may send outbound email to the set of clients. The eDelivery system may receive notification from a vendor or other external system that an attempted outbound communication received a hard or soft bounce. The eDelivery system may further be configured to manage bounced email messages, to flag bad email addresses and update the central controller 110. The eDelivery system may also be configured to make robo-calls to the client if it is determined that an attempted delivery received a hard bounce. In one embodiment, the eDelivery system may be configured to generate a robo-call in the event of multiple bounced emails to a client. The publishing module 170 may also be configured to generate a document for publishing by a printer, and to send an electronic document to a printer for publishing.

For auditing purposes, the publishing module 170 may also be configured to store all outgoing communications.

Further referring to FIG. 3, the central controller 110 receives information from the web site system and the publishing module 170 and stores all updates.

Figure 4:
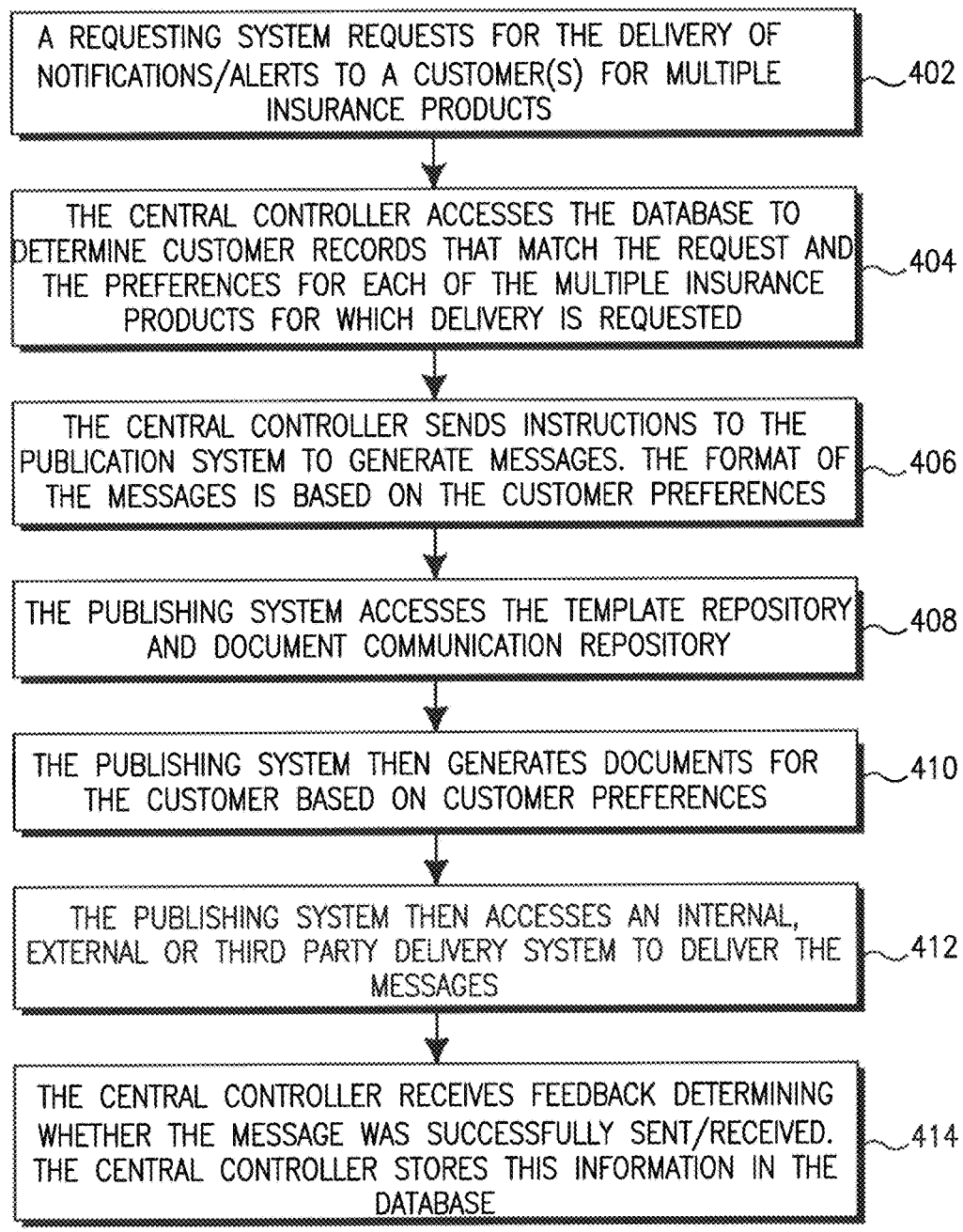
FIG. 4 shows a flow diagram for a method for distributing electronic and paper documents, for multiple insurance products.

FIG. 4 shows a flow diagram for a method 400 for distributing electronic and paper documents to a client for multiple insurance products. The method of FIG. 4 begins with a request for delivery of notification/alerts to a client for multiple insurance products. (Step 402). This request, for example, may be generated internally based on user preferences stored in the system. The request may be triggered based on an alert setting activated based on an event, for example, the user missing a payment of a premium, or the request may be generated by an employee or agent of the insurance company accessing the system via a user device and manually generating the request. The request message may include multiple data fields that specify one or more clients each associated with multiple insurance products. For example, the request may indicate delivery notifications for all clients requesting SMS notification on the 15th of each month.

The central controller 110 may then access the central database 116 to identify the client records that match the request. The central controller 110 may confirm the document distribution settings for each of the client records that match the request. (Step 404)

The central controller 110 then transmits data to the publishing module 170 that indicates a request for generating notification/alert documents. This may include the central controller 110 transmitting one or more messages and/or other information to the publishing module 170 via the interface module 112. The request may include at least two components including an outer envelope and an opaque piece. The outer envelope indicates information including client preferences (e.g. medium and type of alert/notification) and a key. The opaque piece may include business data that fills the template; this includes the message data to be provided to the client, and other information. (Step 406).

After receiving the request for the notification/alert document, the publishing module 170 obtains data that may be used for generating a notification/alert document. The data may include data that describes attributes of the client, including contact information, policy numbers etc. To obtain data related to the client, the publishing module 170 may read in data from and/or perform one or more searches in or queries to the central database 116. The searches or queries may be based on the identifier of the insurance client, and/or other information related to the insurance client. The client data may include one or more of: contact information for the client; the client's name; a phone number for the client; and gender of the client. The publishing module 170 may also obtain plan-related data from the central database 116. The plan-related data may include data that includes consent and/or other information specific to the client. Alternatively or additionally, the input data may include an identifier of one or more legal jurisdictions (e.g., states, territories, municipalities, and/or other governmental entities) whose legal requirements are relevant to determining the notification/alert requirements.

The publishing module 170 then obtains data that describes a template that may be used in conjunction with the message information and other data to generate a notification/alert document. This information may be obtained from the template repository and document repository in the communication database 172. This may include performing a lookup and/or issuing one or more queries to the communication database 172 to obtain template data. As one example, the publishing module 170 may perform a lookup in the communication database 172 based on the type of notification (e.g. late payment) and the medium of communication requested (SMS). The publishing module 170 flags documents previously generated and stored in the database 172 and determines whether new documents need to be generated to respond to the central controller's 110 instructions. (Step 408).

Further, a template document used by the communication generation module 173 may include one or more conditional expressions that indicate that concepts identified in the template document should be described using particular words or phrases in the finalized document. These variable language conditional expressions may be based on parameters such as attributes of the insurance client, attributes related to the clients plan to which the alert/notification document is related, attributes of the policy or modification that the insurance client has requested, and/or other factors. As an example, a template document may include a variable language conditional expression that indicates that, for every occurrence of the concept of "NAME," a word such as "Mr. Client," the client's first name or company name should be used, and that the word that should be used is specific to the client to which the document is related.

Templates used by the publishing module 170 to generate notification/alert documents may be defined according to a number of different formats. For example, a template may be defined according to an Extensible Stylesheet Language Transformations (XSLT) format, a format defined according to a template technology such as MVFLEX Expression Language (MVEL), StringTemplate, Freemarker, Velocity, or other template technology, a specific-purpose template format, and/or any other appropriate format.

After obtaining data that describes a template that may be used to generate the notification/alert, the publishing module 170 generates a notification/alert document. Generating the notification/alert document may include evaluating conditional expressions such as those described above based on the template data, the obtained client data, the obtained policy/plan data, and/or the information included in the request, and determining the text to include (or not include) in the notification/alert document based on the results of the conditional expressions. Further, generating the document may include pre-filling portions of the document with information related to the insurance client on whose behalf the document was requested. The generated document may be formatted according to the selections by the client, such as a an email, SMS, MMS, facsimile, Twitter, Microsoft Word format, Adobe Portable Document Format (PDF), Open Document Format for Office Applications (ODF) format, and/or any other appropriate format. Some messages may be pre-created, for example, a notification to log into the clients account. Additionally, the publishing module 170 may determine that the document requested has been previously generated and stored in the database. (Step 410).

After generating/retrieving the notification/alert document, the publishing module 170 transmits the document to the eDelivery subsystem. The eDelivery subsystem delivers the message to the client using a selected electronic medium (e.g. email, SMS, MMS, Facebook, and Twitter). Alternatively, the publishing module 170 may transmit a formatted document for printing and delivery to the client. (Step 412)

The central controller 110 then receives feedback as to whether the documents were successfully sent/received. This information is stored in the central database 116. (Step 414).

In case the central controller 110 determines that the documents were not successfully sent/received, the central controller 110 may further be configured to send the message on an alternate channel. For example, if the central controller 110 determines that an email address is invalid, it may send a message via Twitter requesting the user access the website and update contact information.

In another scenario, the central controller 110 may determine that an email message associated with one insurance product is received by a user device 130 successfully, but an SMS message was not received successfully. The central controller 110 may be configured to combine future communications for multiple insurance products into a single message transmitted via email.

Figure 5B:
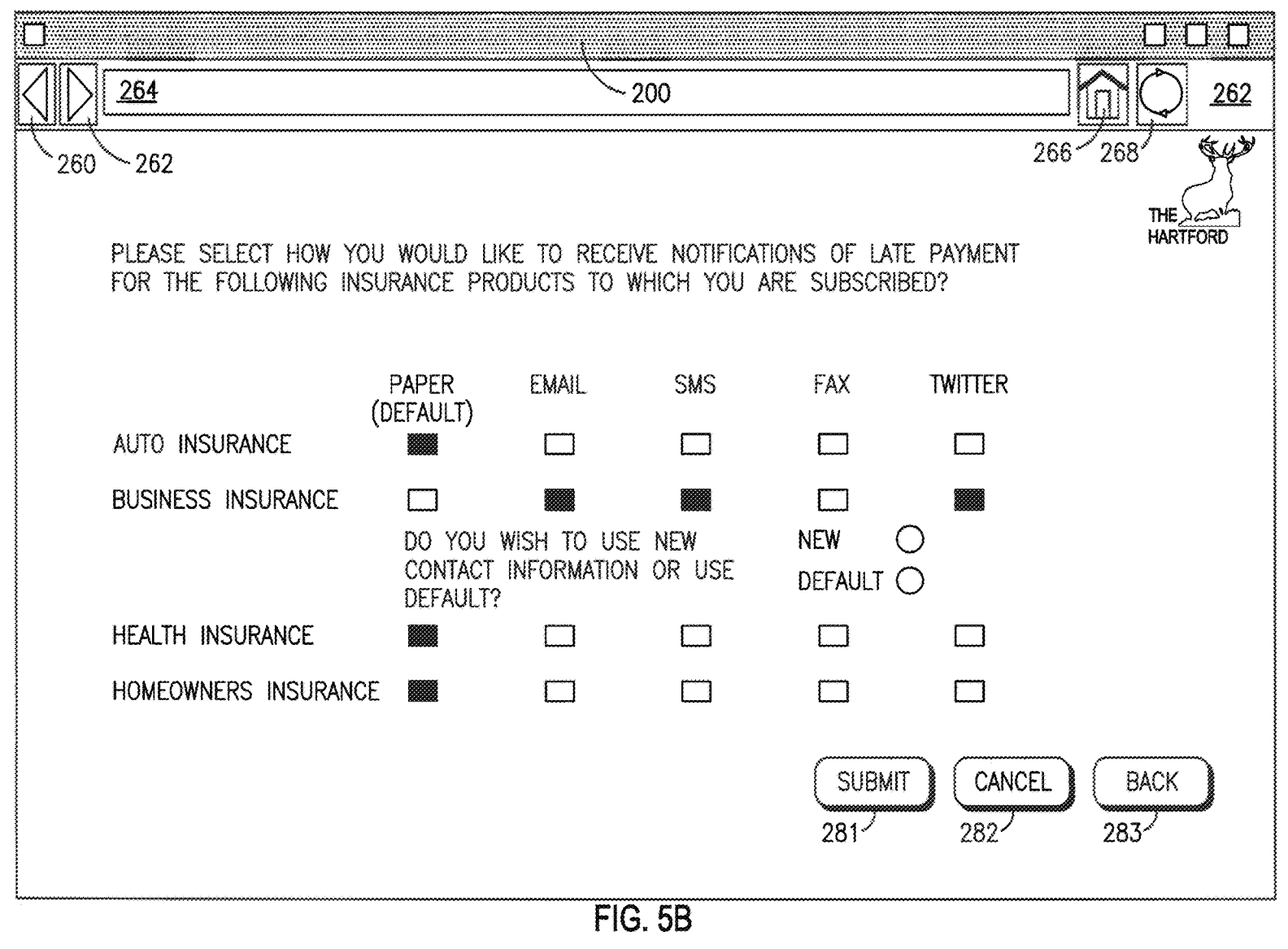
Figure 6:
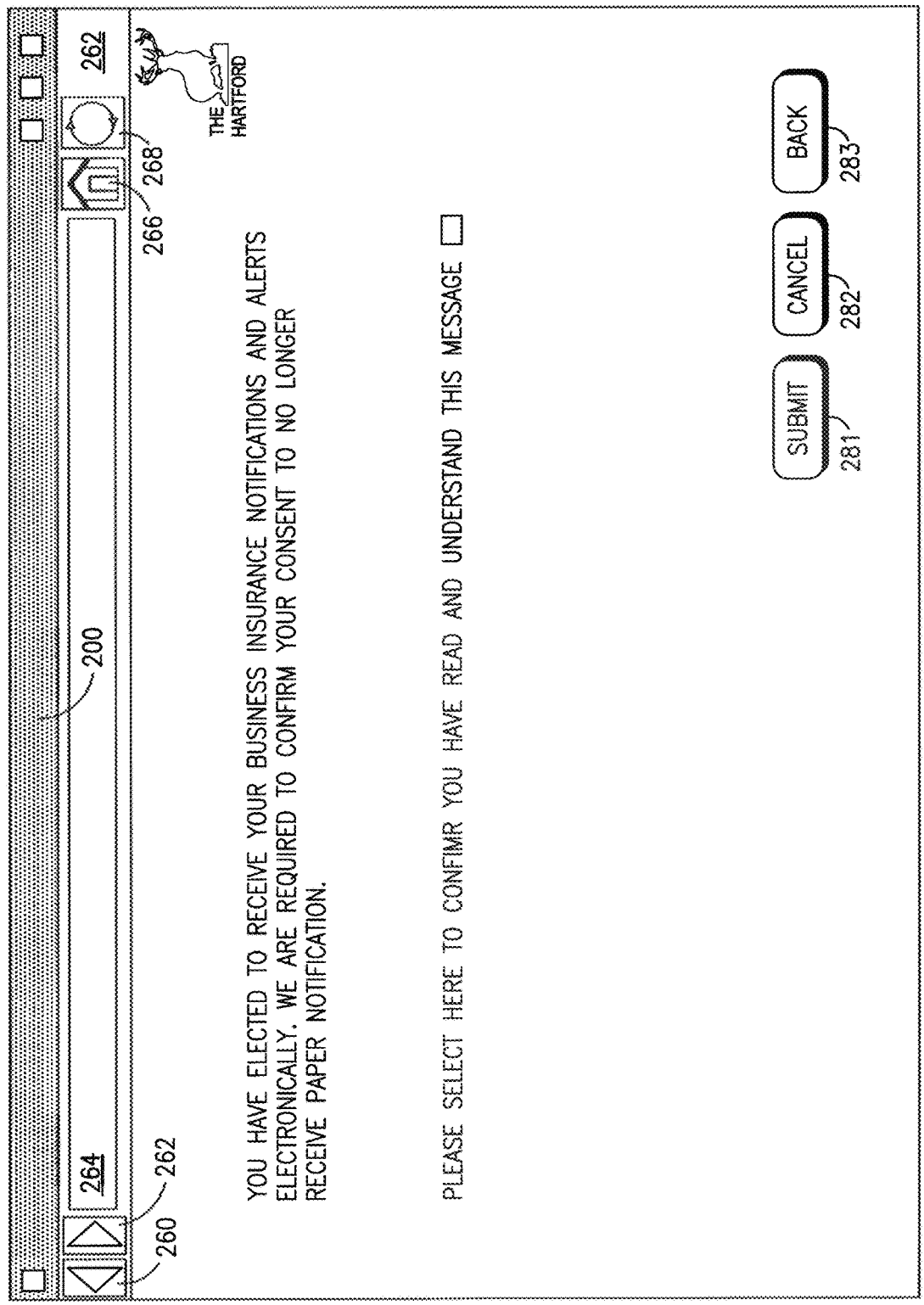
FIG. 6 is an example web page that includes one or more questions that solicit information from the client related to the consent to distribute electronic documents.

FIGS. 5-6 show example web pages that may be displayed by the web browser module 132. As will be described in detail below, the web pages may include display elements which prompt the user of the client device 130 for information about the client's document distribution settings in order to prepare notifications and alerts in accordance with the user's preferences. The web pages may be included in a web browser window 200 that is displayed and managed by the web browser module 132. The web pages may include data received by the web browser module 132 from the web site system 120. The web pages may include information related to products sold by the insurance company, information related to clients that have purchased products sold by the insurance company, and other related information.

The web browser window 200 may include a control area 262 that includes a back button 260, forward button 262, address field 264, home button 266, and refresh button 268. The control area 262 may also include one or more additional control elements (not depicted). The user of the client device 110 may select the control elements 260, 262, 264, 266, 268 in the control area 262. The selection may be performed, for example, by the user clicking a mouse or providing input via keyboard, touch screen, and/or other type of input device. When one of the elements 260, 262, 264, 266, 268 is selected, the web browser module 132 may perform an action that corresponds to the selected element. For example, when the refresh button 268 is selected, the web browser module 132 may refresh the page currently viewed in the web browser window 200.

FIG. 5A is an example web page 502 that includes one or more questions that solicit information from the client related to the type of notification and alerts they prefer to receive. As shown in FIG. 2, the web page 502 may include a question and multiple input fields 530 in the form of radio buttons.

As the user provides input into the input field 530, the web browser module 132 may store one or more data structures ("response data") that reflect the selections made in the input fields 530. Further, as the selections are updated, the web browser module 132 may update the web page 502 to indicate additional or more specific questions that may be associated with the selections. As an example, if the user selects the radio button associated with business insurance and SMS, an additional selection may appear asking how many days late would be required before receiving an SMS reminder.

At any time, while viewing the webpage 502 of FIG. 5A, the user may select the cancel button 232, which cancels any pending action and returns the user to a homepage (not shown). Selecting the previous button 234 allows the user to return to the previous screen, while remaining in a session. Selecting the next button 236 enters the selections which are then transmitted to the web site system 120. If there are no errors in the transmission, the web browser module 132 is directed to a subsequent web page.

As shown in the example of FIG. 5A, the user has elected to receive paper notifications late payment alerts related to their auto insurance, health insurance, and homeowners insurance. The user has selected to receive email, SMS and Twitter for late payment notifications for business insurance.

FIG. 5B shows an example of an updated version of web page 502. As shown in FIG. 5B, the web browser module 132 has received input from the client that electronic document delivery is requested. Accordingly, web browser module 132 has updated the web page 502 to include questions soliciting contact information data from the client. Central database 116 includes contact information for each client and each insurance product associated with the client. The client may enter, using the user device 130, updated client contact information data. This contact information data may be updated at the enterprise level or for each product. Additionally, the central controller 110 may be configured to transmit the updated client contact information data to one or more source systems. This may allow a client to update client contact information data globally through the central controller 110.

FIG. 6 is an example web page 602 that includes one or more questions that solicit information from the client related to the consent to receive non-paper notifications and alerts. As shown in FIG. 6, the web page 602 may include a question and input field 630 in the form of a radio button.

As the user device 130 receives input for the input field 630, the web browser module 132 may store one or more data structures ("response data") that reflect the selections made in the input fields 630. Further, as the selections are updated, the web browser module 132 may update the web page 602 to indicate additional or more specific questions that may be associated with the selections.

At any time, while viewing the webpage 602 of FIG. 5, the user may select the cancel button 232, which cancels any pending action and returns the user to a homepage (not shown). Selecting the previous button 234 allows the user to return to the previous screen, while remaining in a session. Selecting the next button 236 enters the selections which are then transmitted to the web site system 120. If there are no errors in the transmission, the web browser module 132 is directed to a subsequent web page.

Figure 7:
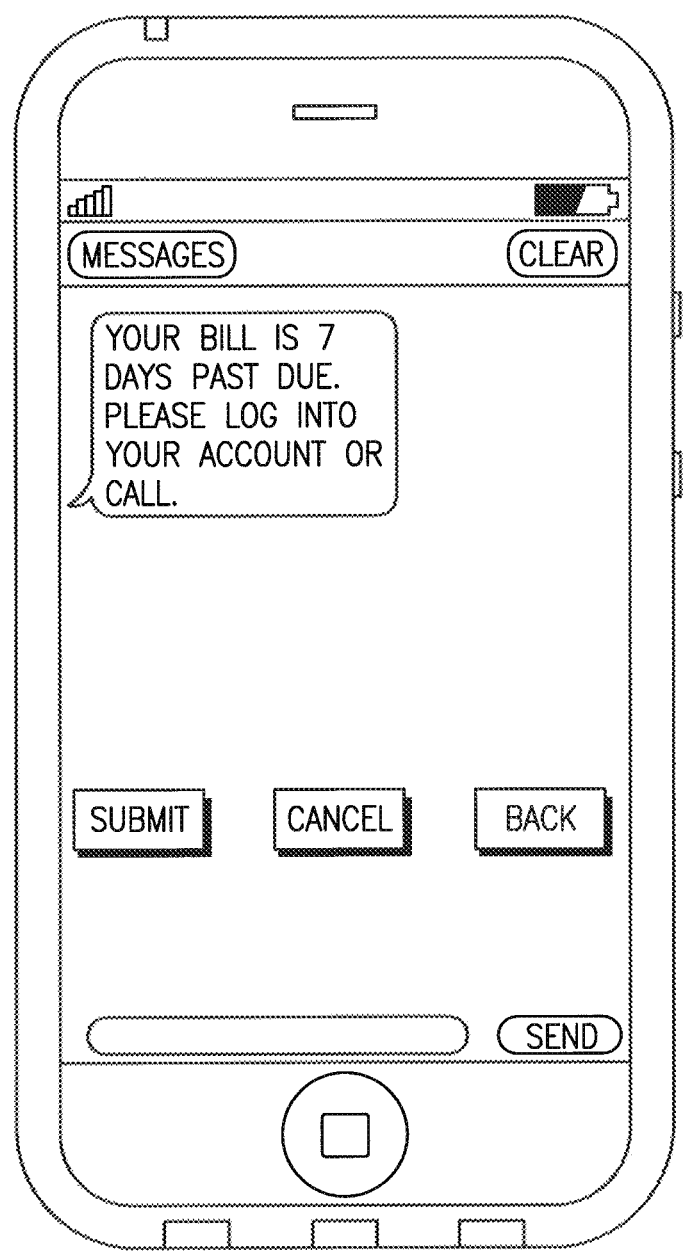
FIG. 7 shows a late payment alert sent to a user device via an SMS communication channel.
Figure 8:
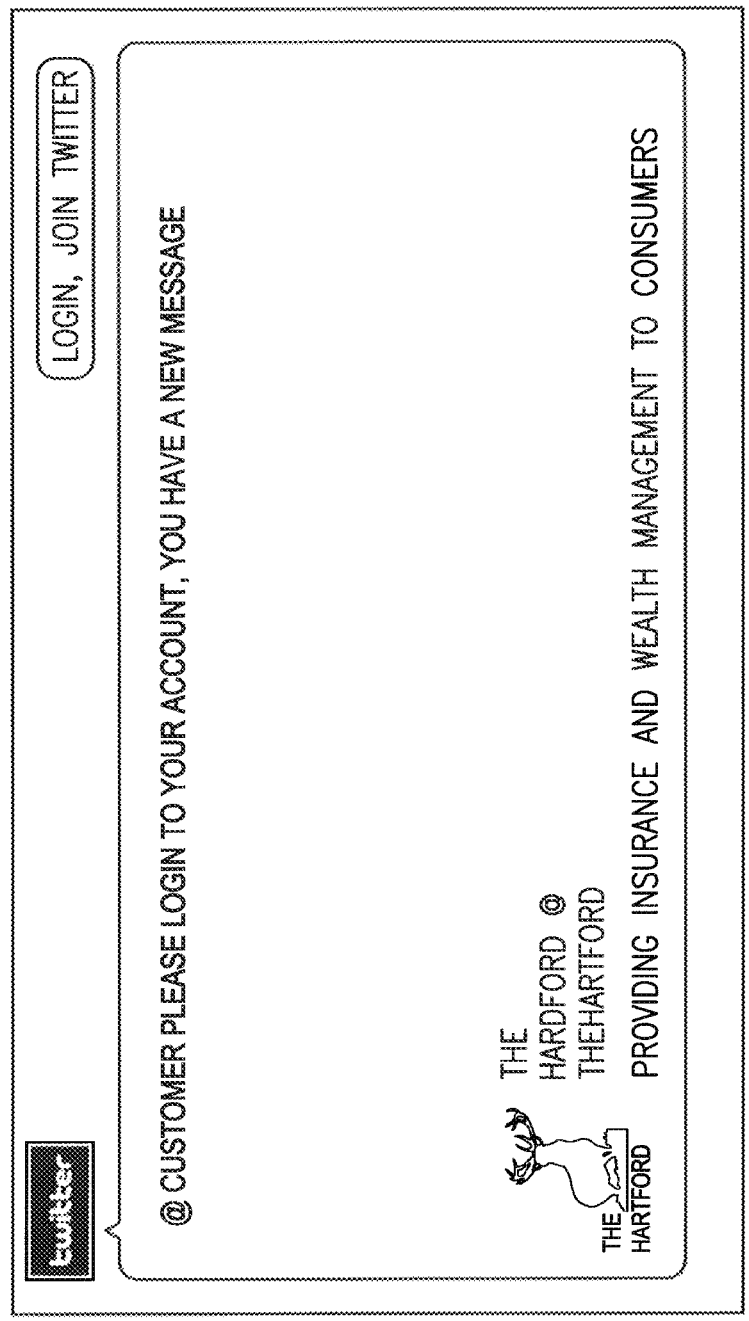
FIG. 8 shows a late payment alert sent to a user device via Twitter.
Figure 9:
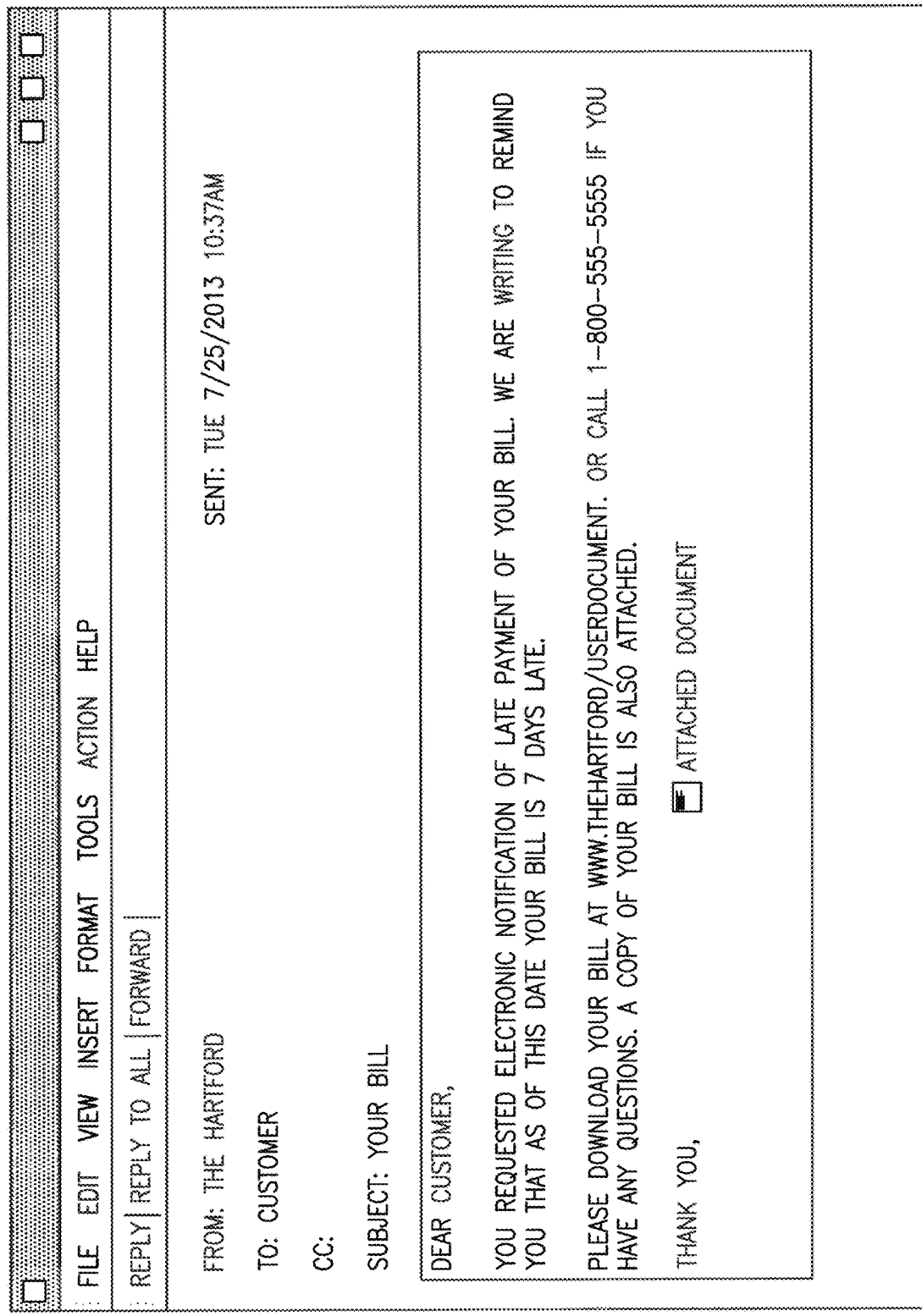
FIG. 9 shows a late payment alert sent to a user device via email.

FIGS. 7-9 show example alerts generated based on the example shown in FIG. 5. As described above, the user may select multiple mediums of documents for notifications and alert. The publishing module 170 formats the content of the text based on the selected medium.

FIG. 7 shows a late payment alert sent to a user device via an SMS communication channel. The central controller 110 receives an alert from a source system 140 that payment is 7 days late. Referring back to FIG. 5, the user opted to receive late payment notification via SMS. SMS messaging limits messages to 140 bytes. Accordingly, the communication generation module 173 accesses a template stored in the communication database 172 and generates an appropriate message. The message is then sent to a user device, as shown in FIG. 7.

FIG. 8 shows a late payment alert sent to a user device via Twitter. The central controller 110 receives an alert from a source system 140 that payment is 7 days late. Referring back to FIG. 5, the user opted to receive late payment notification via Twitter. Twitter information may be publically viewed/non-secure. The communication generation module 173 accesses a template stored in the communication database 172 and generates an appropriate message with no confidential information. The message is then sent to a Twitter account pre-selected by the user.

FIG. 9 shows a late payment alert sent to a user device via email. The central controller 110 receives an alert from a source system 140 that payment is 7 days late. Referring back to FIG. 5, the user opted to receive late payment notification via email. Email typically offers the most robust communication abilities because it may be more secure and there is no word limit. The communication generation module 173 accesses a template stored in the communication database 172 and generates an appropriate message. The message is then sent to an email account pre-selected by the user.

Figure 10:
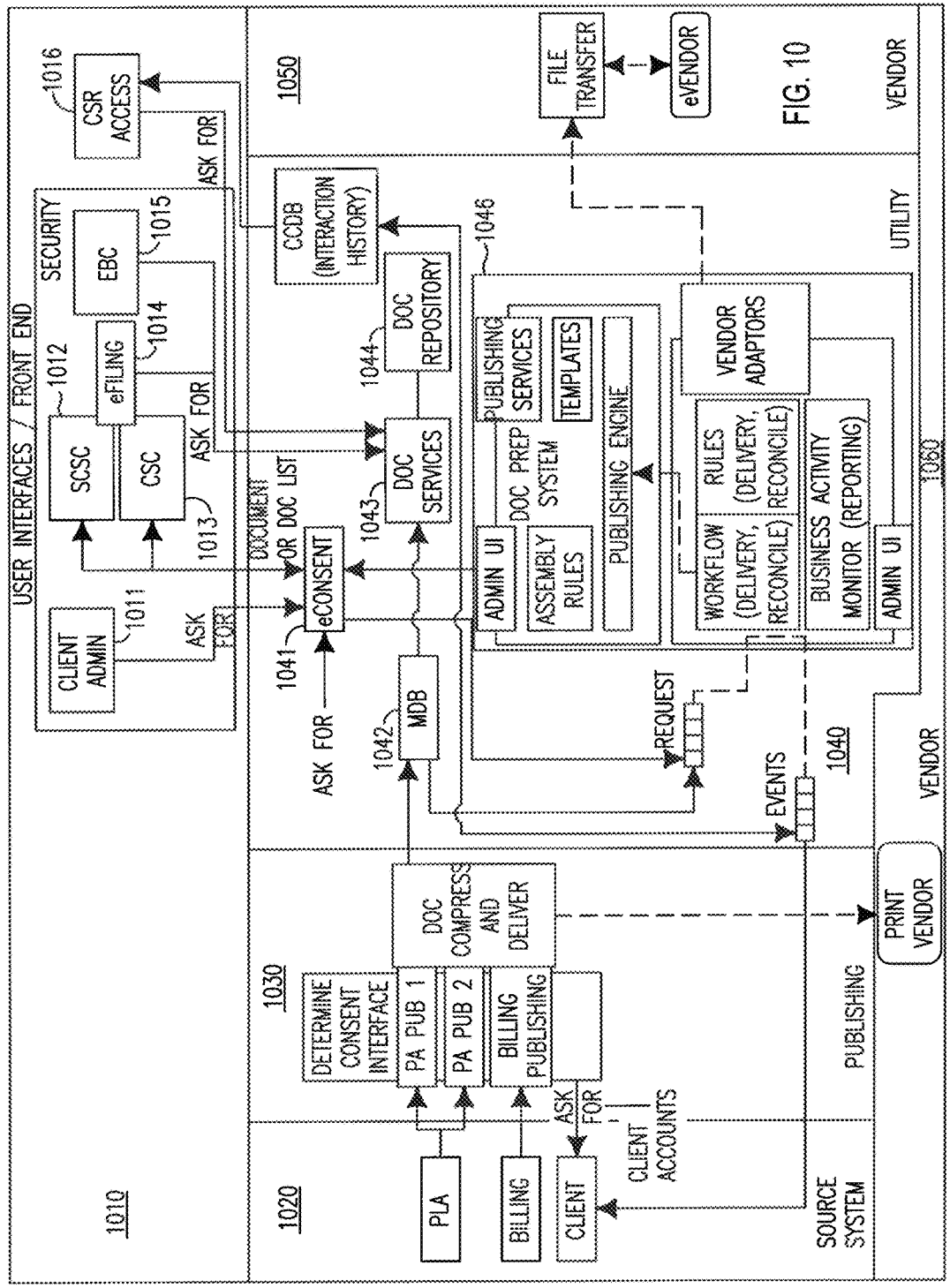
FIG. 10 shows another example architecture that may be used for the distributing electronic and paper documents.

FIG. 10 shows another example architecture that may be used for the distributing electronic and paper documents. The system 1000 is designed for Prepare, Deliver and Archive (PDA) services. The system may include a user interface module 1010, a source system module 1020, a publishing module 1030, a utility module 1040, and multiple vendor modules 1060 and 1070.

The user interface module 1010 acts as the front end for the system 1000. The user interface module 1010 allows different classes of users to access the system 1000, including agents, clients and administrators. The user interface 1010 also provides a layer of security preventing the unauthorized access to a client's information. The user interface module 1010 includes a client/admin module 1011, an SCSC module 1012, a CSC module 1013, an eFiling module 1014, an EBC module 1015, and a CSR access module 1016.

The client/admin module 1011 is the system of record for a client of customer. An administrator may use internal tools to view client consent settings and preferences. eConsent services may only be invoked by a duly authenticated and authorized application and/or user. Any client of a service operation must furnish an application ID and password.

The small commercial service center (SCSC) module 1012 provides a B2C website for access by small business clients. The consumer service center (CSC) module 1013 provides a website interface for commercial customers. Both the SCSC module 1012 and the CSC module 1013 present the website 120 to the client. They allow the client to login and view electronic documents. These modules use eConsent to store email address as system of record. They also track email status (i.e. bounces). The SCSC module 1012 and the CSC module 1013, communicate with the utility module 1040 to verify and confirm consent for client requests.

Both the SCSC module 1012 and the CSC module 1013 are operatively coupled to the eFiling cabinet 1014. The eFiling cabinet 1014 provides a central facility storing any documents associated with a customer.

The electronic business center (EBC) 1015 provides a website for agents. The EBC 1015 provides agents with a front end use to access documents stored in the system.

CSR Access 1016 provides access for internal users (administrators) to view any documents stored on the system.

The utility module 1040 acts as a central unit for PDA services. When the user interface module 1010 requests access to view or modify client settings or to request publication, the utility module 1040 receives and processes these requests. The utility module 1040 includes an eConsent module 1041, an MDB module 1042, a document services module 1043, a document repository module 1044, a CCDB module 1405, and a PDA module 1046.

Figure 11:
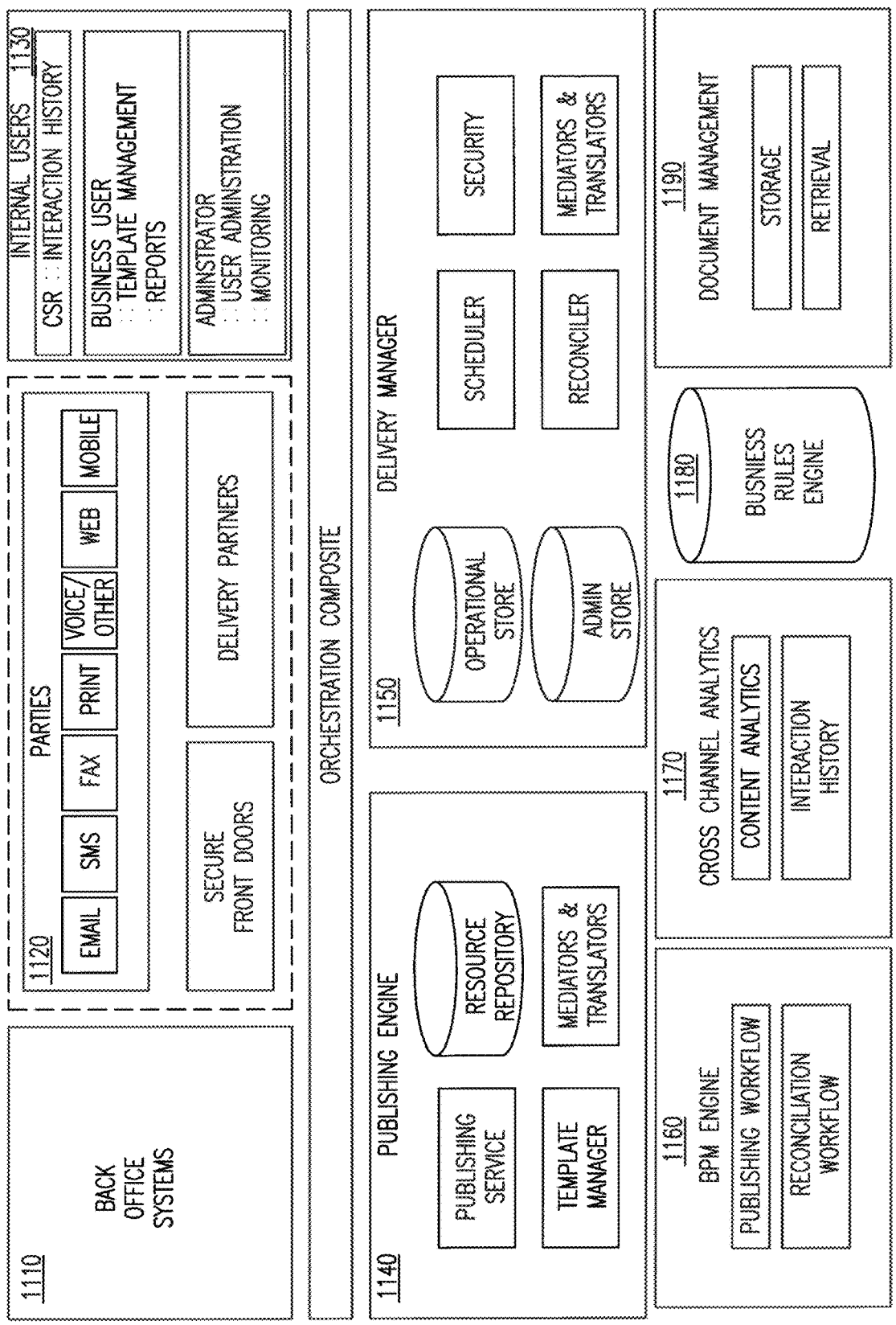
FIG. 11 shows an example customer communications management architecture.

The eConsent module 1041 is configured to act as a central management and repository for eConsent. Requests for publication of client information must request consent from the eConsent module 1041. Referring to FIG. 11, the front end module 1010, the publishing module 1030 must all request consent from the eConsent module 1041.

The Message Driven Bean (MDB) 1042 is a component that receives requests from the document compression and delivery system located in the publishing module 1030. The MDB 1042 receives the requests, queues the request and sends it to the document services module 1043 so it may be archived and then sends the request to the PDS module 1046 so that a request can be sent electronically.

The document repository 1044 stores a copy of every policy or bill generated. The document repository 1044 may also store copies of any emails, or other documents generated.

The document services module 1043 manages requests for these documents; it also allows a user to search, view and insert documents into the document repository 1044. The document services module 1043 is configured to query the repository 1044 for documents, alerts and notifications. The document services module 1043 may also allow an agent to access the repository 1044 to view emails sent to clients.

The customer communication database (CCDB) 1045 stores the physical database schema, describing eConsent data structures which allow various types of eConsent queries and updates. Each interaction with a client is recorded in the CCDB (including phone call, email, web etc.).

The PDA module 1046 may initiate workflows depending on distribution and email rules and preferences. The PDA module 1046 may comprise a document preparation system and a work flow system. The PDA module 1046 executes on templates and rules and data passed and returns a published document for distribution.

The document preparation system of the PDA module 1046 assembles different types of documents, using stored templates. The document preparation system of PDF module 1046 may generate these documents for communication over different communication channels. The document preparation system of PDA module 1046 may create, for example, HTML, PDF, PostScript, and text based documents. As shown in FIG. 10, the PDA module 1046 includes a publishing engine for creating these documents. The publishing engine may access templates stored in memory and assembly rules for generating these documents. For example, these assembly rules may note that if the communication is being sent via an unsecured communication channel, to remove all sensitive or identifying client data. An administrative user interface in the document preparation system of the PDA module 1046 allows an administrator or vendor to craft and maintain custom documents according to their own preference.

The workflow system of PDA module 1046 manages the workflow of the PDA 1046. The workflow system of PDA module 1046 manages, records, and reports on communications. The workflow system of PDA module 1046 may handle archiving, settling the email, and the overall publishing process. Reconciliation data may be received by the PDA module 1046 which may execute appropriate integrations or processes based on document requirements. The business activity monitor is configured to generate reports of successful/unsuccessful deliveries. The PDA module 1046 may also be configured to adapt publications for communications with external vendors. The PDA module 1406 may also be configured to receive analytics and reports from vendors which may be used to generate web analytics usage information. The business activity monitor/reporting tracks the number of messages and types of messages sent. It may also be configured to perform reporting. The vendor adapter may be configured to adapt documents for any outside vendor that is used. This allows the system 1000 to be vendor agnostic.

The publishing module 1030 includes a determine consent interface which determines eConsent if a bill needs to be generated. The publishing module 1030 determines how documents will be generated. The publishing module 1030 may include multiple policy administration publishing units based on the types of policy for which a document is required. As shown in FIG. 10, PA Pub 1. may be used for a standard policy and PA Pub. 2 may be used it a nonstandard policy requires some document to be printed. A separate module may be used to determine consent for billing documents. The publishing module includes a software package that performs document compression and delivery. In case the client has not requested electronic delivery of documents, the document compression and delivery module may send the requested documents to a print vendor 1060 for preparation of the requested documents. If the client has consented to electronic document delivery, the document compression and delivery module interfaces with the MDB 1042 for the preparation of electronic documents. The publishing module 1030 may initiate to PDA to start the email publishing and distribution process.

The source system module 1020 may be configured to generate and transmit requests to the PDA module 1046. The source system module 1020 may include a personal lines automation (PLA) unit. The PLA unit may include a policy administration for a consumer. The PLA unit may generate policies, renewals, and endorsements. The source system 1020 may further include a billing system. The billing system may provide a central source to generate bills. The client system in the source system 1020 may be the same as client/admin system 1011 or separate. This client system may perform error handling. This client system may also receive updates for any bad contact information.

The vendor module 1050 may receive documents from the PDA module 1046. The vendor module 1050 includes a file transfer system for sending the messages in large batches to an eVendor which may then distribute documents. Additionally, the PDA module 1046 may forward smaller numbers of messages directly to an eVendor. Alternatively (not shown in the figure) the PDA module 1046 may directly send the documents to clients.

FIG. 11 shows an example customer communications management architecture. The architecture of the communications management system 1100 shown in FIG. 11 offers a high level conceptual presentation of generating customized documents. Back office systems 1110, including computers, servers, memory devices, and user interfaces form the core of the system. The system 1100 may include multiple parties 1120 (i.e. recipients) of documents generated by the system 1100. The communication management system 1100 may transmit the customized documents via a number of communication channels. The communication channels include email, SMS, fax, print, voice/other, web, mobile, or via other delivery partners (e.g. vendors which send documents via email, physical mail, fax etc.). A secure front door manages access to this information. The communication management system 1100 may include multiple internal users 1130. This includes the CSR which may access the interaction history, the business user which manages templates and may generate reports, and an administrator that monitors and manages the system. The publishing engine 1140 may include multiple modules, including a publication service for generating the publication, a template manager for storing the templates to customize documents, a resource repository for storing the information portion of the message, and mediators and translators for ensuring integration of the information into the proper format. The communication management system 1100 may also include a delivery manager 1150. This delivery manager 1150 may include an operational store, and administration store, a scheduler for scheduling alerts and notifications, a reconciler for reconciling transmissions, a security unit to assure privacy, and mediators and translators for assuring the delivery manager units operate efficiently. A business process management (BPM) engine 1160 controls the publishing workflow as well as reconciliation workflow. A cross channel analytics module 1170 is configured to perform and store content analytics as well as store an interaction history. The cross channel analytics units may allow for a multichannel analytic report detailing the effectiveness of each channel of communication. A business rules engine 1180 may be used to set rules for communication based on business rules determined by the insurance company, based on rules and regulations, and other non-customer set preferences. The communication management system 1100 may also include a document management module 1180 for the storage and retrieval of all documents that have been generated and or sent.

Figure 12:
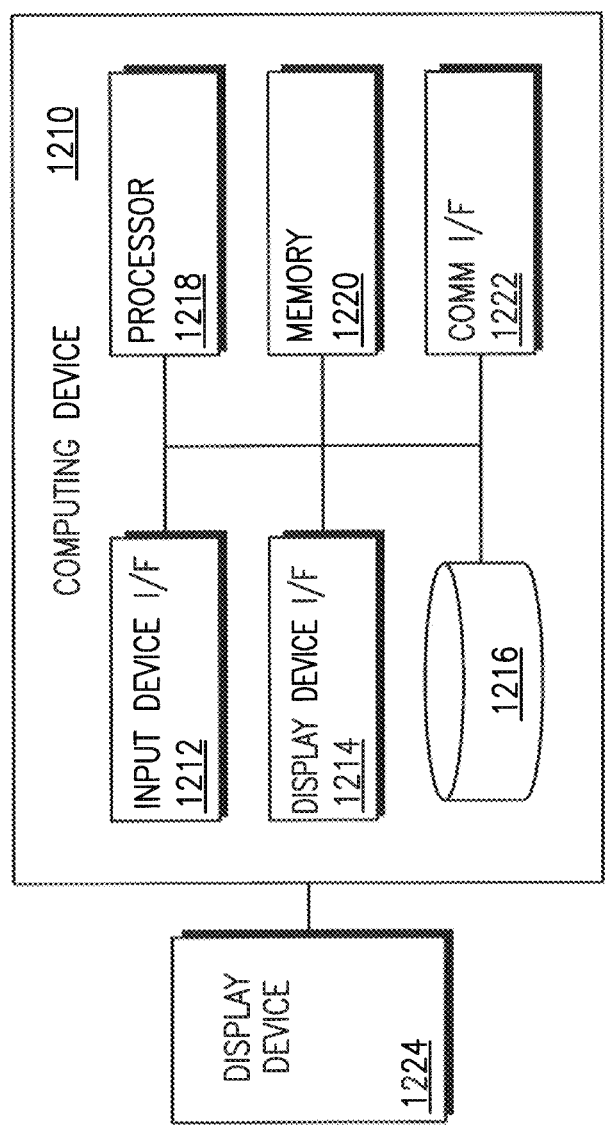
FIG. 12 shows an example computing device that may be used to implement features described herein with reference to FIGS. 1-11.

FIG. 12 shows an example computing device 1210 that may be used to implement features describe above with reference to FIGS. 1-11. The computing device 1210 includes a processor 1218, memory device 1220, communication interface 1222, peripheral device interface 1212, display device interface 1214, and storage device 1216. FIG. 12 also shows a display device 1224, which may be coupled to or included within the computing device 1210.

The memory device 1220 may be or include a device such as a Dynamic Random Access Memory (D-RAM), Static RAM (S-RAM), or other RAM or a flash memory. The storage device 1216 may be or include a hard disk, a magneto-optical medium, an optical medium such as a CD-ROM, a digital versatile disk (DVDs), or Blu-Ray disc (BD), or other type of device for electronic data storage.

The communication interface 1222 may be, for example, a communications port, a wired transceiver, a wireless transceiver, and/or a network card. The communication interface 1222 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 1212 may be an interface configured to communicate with one or more peripheral devices. The peripheral device interface 1212 may operate using a technology such as Universal Serial Bus (USB), PS/2, Bluetooth, infrared, serial port, parallel port, and/or other appropriate technology. The peripheral device interface 1212 may, for example, receive input data from an input device such as a keyboard, a mouse, a trackball, a touch screen, a touch pad, a stylus pad, and/or other device. Alternatively or additionally, the peripheral device interface 1212 may communicate output data to a printer that is attached to the computing device 1210 via the peripheral device interface 1212.

The display device interface 1214 may be an interface configured to communicate data to display device 1224. The display device 1224 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1214 may operate using technology such as Video Graphics Array (VGA), Super VGA (S-VGA), Digital Visual Interface (DVI), High-Definition Multimedia Interface (HDMI), or other appropriate technology. The display device interface 1214 may communicate display data from the processor 1218 to the display device 1224 for display by the display device 1224. As shown in FIG. 12, the display device 1224 may be external to the computing device 1210, and coupled to the computing device 1210 via the display device interface 1214. Alternatively, the display device 1224 may be included in the computing device 1200.

An instance of the computing device 1210 of FIG. 12 may be configured to perform any feature or any combination of features described above as performed by the user device 130. In such an instance, the memory device 1220 and/or the storage device 1216 may store instructions which, when executed by the processor 1218, cause the processor 1218 to perform any feature or any combination of features described above as performed by the web browser module 132. Alternatively or additionally, in such an instance, each or any of the features described above as performed by the web browser module 132 may be performed by the processor 1218 in conjunction with the memory device 1220, communication interface 1222, peripheral device interface 1212, display device interface 1214, and/or storage device 1216.

Figure 13:
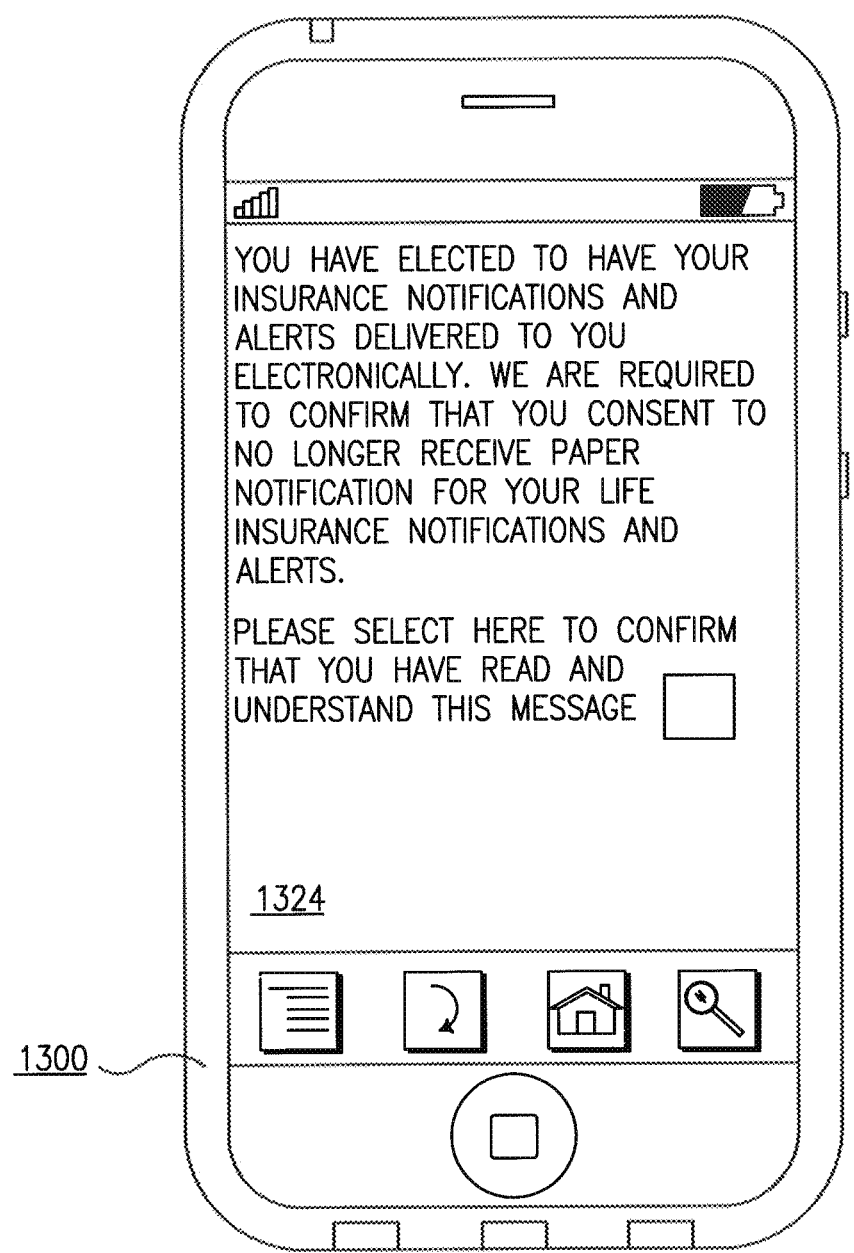
FIG. 13 is a tablet computer that is a more specific example of the computing device of FIG. 12.

FIG. 13 shows a tablet computer 1310 that is a more specific example of the computing device 1210 of FIG. 12. The tablet computer 1310 may include a processor (not depicted), memory device (not depicted), communication interface (not depicted), peripheral device interface (not depicted), display device interface (not depicted), storage device (not depicted), and touch screen display 1324, which may possess characteristics of the processor 1218, memory device 1220, communication interface 1222, peripheral device interface 1212, display device interface 1214, storage device 1216, and display device 1224, respectively, as described above with reference to FIG. 12. The touch screen display 1324 may receive user input using technology such as, for example, resistive sensing technology, capacitive sensing technology, optical sensing technology, or any other appropriate touch-sensing technology. As shown in FIG. 13, the touch screen display 1324 may display a notification/alert document, with characteristics of any or any combination of documents described above with reference to FIGS. 1-11. The touch screen display 1324 may receive input from a user of the tablet computer 1310, for filling in a notification/alert document shown in the touch screen display 1324.

Referring again to FIG. 12, an instance of the computing device 1210 may alternatively or additionally be configured to perform any feature or any combination of features described above as performed by the central controller 110, the publishing module 170, and the source systems 140 and 150. In such an instance, the memory device 1220 and/or the storage device 1216 may store instructions which, when executed by the processor 1218, cause the processor 1218 to perform any feature or any combination of features. In such an instance, the processor 1218 may perform the feature or combination of features in conjunction with the memory device 1220, communication interface 1222, peripheral device interface 1212, display device interface 1214, and/or storage device 1216.

Alternatively or additionally, an instance of the computing device 1210 may be configured to perform any feature or any combination of features described above as performed by the user device 130. In such an instance, the memory device 1220 and/or the storage device 1216 may store instructions which, when executed by the processor 1218, cause the processor 1218 to perform any feature or any combination of features described above as performed by the consumer client module 130. In such an instance, the processor 1218 may perform the feature or combination of features in conjunction with the memory device 1220, communication interface 1222, peripheral device interface 1212, display device interface 1214, and/or storage device 1216.

Alternatively or additionally, an instance of the computing device 1210 may be configured to perform any feature or any combination of features described above as performed by the web site system 120. In such an instance, the memory device 1220 and/or the storage device 1216 may store instructions which, when executed by the processor 1218, cause the processor 1218 to perform any feature or any combination of features described above as performed by the user device 130, web application module 122 and/or the HTTP server module 124. In such an instance, the processor 1218 may perform the feature or combination of features in conjunction with the memory device 1220, communication interface 1222, peripheral device interface 1212, display device interface 1214, and/or storage device 1216.

Although FIG. 12 shows that the computing device 1210 includes a single processor 1218, single memory device 1220, single communication interface 1222, single peripheral device interface 1212, single display device interface 1214, and single storage device 1216, the computing device may include multiples of each or any combination of these components 1218, 1220, 1222, 1212, 1214, 1216, and may be configured to perform, mutatis mutandis, analogous functionality to that described above.

As used to herein, the term "document" broadly refers to and is not limited to a paper document, an electronic file defining a paper document, a social media post, an SMS, an email, or any electronic medium of communication used to deliver a message.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features described above with reference to FIGS. 1-13 are described above as performed using the example architecture 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-13 may be used alone without the other features and elements or in various combinations with or without other features and elements. Sub-elements of the methods and features described above with reference to FIGS. 1-13 may be performed in any arbitrary order (including concurrently), in any combination or sub-combination.

What is claimed is:

1. A web-based system for enterprise distribution of electronic and paper documents to a plurality of users, the system comprising:
  a consent interface that includes:
    a memory device configured to store policy information for multiple insurance products associated with each of a plurality of clients;
    the memory device further configured to store document delivery settings for each of the multiple insurance products, the document delivery settings including contact information and notification/alert preferences;
    a processor, operably coupled to the memory device, configured to generate a plurality of document delivery questions, the questions relating to the preferred medium for notification and alert documents for each of the multiple insurance products;
    a receiver configured to receive a response to the document delivery questions from a user device and to store the response to the document delivery questions in the memory device; and
    on a condition that the response to the document delivery questions indicates a change from paper documents to electronic documents, the processor further configured to generate consent questions, wherein the generated consent questions are provided in a message that at least identifies the type of the multiple insurance products to include electronic delivery and at least two types of electronic delivery available for selection and confirm consent to deactivate paper notification for notification/alert preferences for that type of the multiple insurance products;
  a consent generator configured to update web-based system to set the communication setting for at least the first and the second of the multiple insurance products based on the response to the document delivery questions and the consent questions, identify user consent, and generate the confirmation for the user, and on a condition that the confirmation is generated, provide the generated confirmation to the consent interface; and
  a publishing system including a communication generator, a consent confirmer, and a communications interface, wherein:
    the communication generator configured to generate an electronic document to be delivered to at least one of the plurality of users;
    the consent confirmer, via a transmitter, transmits a message to at least one of the plurality of clients, the message notifying the at least one of the plurality of clients of the change in the document delivery settings and the consent confirmer transmitter transmits a message to a source system, the message notifying the source system of the change in document delivery settings; and
    the communications interface including a transmitter configured to receive information from the consent confirmer, electronically deliver the document in accordance with the communication settings, and a processor configured to determine whether the documents were received by receiving feedback information that the document was successfully sent and received, wherein the processor is further configured to determine that a message sent to an email address associated with a client was not received or received in error based on a hard bounce or a soft bounce.

2. The system of claim 1, wherein the consent received is on an enterprise level.

3. The system of claim 1, wherein the processor is configured to perform a batch update of consent for a plurality of source systems.

4. The system of claim 1, wherein the processor is further configured to generate a consent email at predetermined intervals.

5. The system of claim 1, wherein the processor is configured to negotiate credentials with a plurality of source systems to confirm client authorization.

6. A method in a web-based system for dynamic enterprise document distribution, the system comprising:
  storing, by a memory device of a consent interface, policy information for multiple insurance products associated with each of a plurality of clients;
  storing, by the memory device, document delivery settings for each of the multiple insurance obligations, the document delivery settings including contact information and notification/alert preferences;
  generating, by a processor of the consent interface, a plurality of document delivery questions, the questions relating to the preferred medium for notification and alert documents for each of the multiple insurance obligations;
  receiving, by a receiver of the consent interface, a response to the document delivery questions from a user device and to store the response to the document delivery questions in the memory device;
  on a condition that the response to the document delivery questions indicates a change from paper documents to electronic documents, generating, by the processor, consent questions, wherein the generated consent questions are provided in a message that at least identifies the type of the multiple insurance products to include electronic delivery and at least two types of electronic delivery available for selection and confirm consent to deactivate paper notification for notification/alert preferences for that type of the multiple insurance products;
  updating, by a consent generator, the web-based system to set the document delivery settings in the memory device for the multiple insurance products based on the response to the document delivery questions and the consent questions;
  identifying user consent;
  generating the confirmation for the user, and on a condition that the confirmation is generated, providing the generated confirmation to the consent interface;
  generating, by a communication generator of a publishing system, an electronic document to be delivered to at least one of a plurality of users;
  transmitting, by a transmitter of the consent confirmer, a message to at least one of the plurality of clients, the message notifying the at least one of the plurality of clients of the change in the document delivery settings and transmitting a message to a source system, the message notifying the source system of the change in document delivery settings; and determining, by the processor, whether the documents were received by receiving feedback that the documents were successfully sent and received, wherein the processor is further configured to determine that a message sent to an email address associated with a client was not received or received in error based on a hard bounce or a soft bounce.

7. The method of claim 6, wherein the consent received is on an enterprise level.

8. The method of claim 6, further comprising performing a batch update of consent for a plurality of source systems.

9. The method of claim 6, further comprising generating a consent email at predetermined intervals.

10. The method of claim 6, further comprising negotiating credentials with a plurality of source systems to confirm client authorization.

11. A web-based system for enterprise distribution of communications to a plurality of users in a distributed network, the system comprising:

a consent interface that includes:

a memory device configured to store information for multiple financial service products associated with each of a plurality of clients;

the memory device further configured to store communication settings for each of the multiple financial service products, the communication settings including contact information and notification/alert preferences;

a processor, operably coupled to the memory device, configured to generate a plurality of communication preference questions, the questions relating to the preferred medium for communications;

a receiver configured to receive a response to the communication preference questions from a user device and to store the response to the communication preference questions in the memory device; and on a condition that the response to the communication preference questions indicates a change from paper to electronic, the processor further configured to generate consent questions, wherein the generated consent questions are provided in a message that at least identifies the type of the multiple insurance products to include electronic delivery and at least two types of electronic delivery available for selection and confirm consent to deactivate paper notification for notification/alert preferences for that type of the multiple insurance products;

a consent generator configured to update the web-based system to set the communication settings in the memory device for the multiple financial service products based on the response to the communication preference questions and the consent questions, identify user consent, and generate the confirmation for the user, and on a condition that the confirmation is generated, provide the generated confirmation to the consent interface;

a consent confirmer transmitter configured to transmit a message to at least one of the plurality of clients, the message notifying the at least one of the plurality of clients of the change in the communication preference settings and the consent confirmer transmitter further configured to transmit a message to a source system, the message notifying the source system of the change in communication preference settings; and a communications interface processor configured to determine whether the messages were received by receiving feedback that the messages were successfully sent and received, wherein the processor is further configured to determine that a message sent to an email address associated with a client was not received or received in error based on a hard bounce or a soft bounce.

12. The system of claim 11, wherein at least one of the multiple financial service products is insurance.

13. The system of claim 11, wherein at least one of the communication settings is to receive communication via email.

14. The system of claim 11, wherein the consent received is on an enterprise level.

15. The system of claim 11, wherein the processor is configured to perform a batch update of consent for a plurality of source systems.

* * * * *